United States Patent
Serkh et al.

(10) Patent No.: US 9,068,608 B2
(45) Date of Patent: Jun. 30, 2015

(54) ISOLATOR DECOUPLER

(75) Inventors: Alexander Serkh, Troy, MI (US);
Imtiaz Ali, Lathrup Village, MI (US);
Peter Ward, Farmington Hills, MI (US)

(73) Assignee: Gates Corporation, Denver, CO (US)

( * ) Notice: Subject to any disclaimer, the term of this patent is extended or adjusted under 35 U.S.C. 154(b) by 1394 days.

(21) Appl. No.: 12/586,093

(22) Filed: Sep. 17, 2009

(65) Prior Publication Data

US 2011/0065537 A1    Mar. 17, 2011

(51) Int. Cl.
*F16D 3/00*     (2006.01)
*F16H 55/14*    (2006.01)
*F16H 55/36*    (2006.01)
*F16H 9/00*     (2006.01)
*F16H 59/00*    (2006.01)
*F16H 61/00*    (2006.01)
*F16H 63/00*    (2006.01)
*F16D 41/20*    (2006.01)
*F16D 7/02*     (2006.01)
*F16F 15/121*   (2006.01)

(52) U.S. Cl.
CPC .............. *F16D 41/206* (2013.01); *F16D 7/022* (2013.01); *F16F 15/1216* (2013.01); *F16H 55/36* (2013.01); *F16H 2055/366* (2013.01)

(58) Field of Classification Search
CPC . F16H 55/36; F16H 2055/366; F16D 41/206; F16D 7/022; F02B 7/06
USPC ................................. 474/94, 70, 74; 192/56.2
See application file for complete search history.

(56) References Cited

U.S. PATENT DOCUMENTS

| | | | |
|---|---|---|---|
| 3,618,730 A * | 11/1971 | Mould, III | 192/56.2 |
| 5,139,463 A * | 8/1992 | Bytzek et al. | 474/69 |
| 5,156,573 A | 10/1992 | Bytzek et al. | 474/74 |
| 5,598,913 A | 2/1997 | Monahan et al. | 192/41 |
| 6,083,130 A | 7/2000 | Mevissen et al. | 474/70 |
| 6,394,248 B1 * | 5/2002 | Monahan et al. | 192/41 S |
| 6,761,656 B2 | 7/2004 | King et al. | 474/74 |
| 6,923,303 B2 | 8/2005 | Liston et al. | 192/41 |
| 7,052,420 B2 | 5/2006 | King et al. | 474/74 |
| 7,070,033 B2 * | 7/2006 | Jansen et al. | 192/41 S |
| 7,766,774 B2 * | 8/2010 | Antchak et al. | 474/74 |
| 2004/0072641 A1 * | 4/2004 | Nakamura | 474/70 |
| 2006/0144664 A1 * | 7/2006 | Antchak et al. | 192/41 S |
| 2007/0066426 A1 * | 3/2007 | Kamdem et al. | 474/94 |
| 2008/0108442 A1 * | 5/2008 | Jansen et al. | 464/54 |
| 2009/0176583 A1 * | 7/2009 | Dell et al. | 464/40 |

FOREIGN PATENT DOCUMENTS

| | | |
|---|---|---|
| WO | 2004011818 A1 | 2/2004 |
| WO | 2009031589 A1 | 3/2009 |

* cited by examiner

*Primary Examiner* — Henry Liu
(74) *Attorney, Agent, or Firm* — Jeffrey A. Thurnau; Paul N. Dunlap

(57) ABSTRACT

An isolator decoupler comprising a pulley, a shaft, a bushing slidingly engaged with the pulley and slidingly engaged with the shaft, the pulley journalled to the shaft by a bearing, a one-way clutch fixed to the shaft and engaged with the bushing whereby the bushing rotates in unison with the one-way clutch, a torsion spring engaged between the pulley and the one-way clutch to resiliently couple the pulley to the shaft, and the pulley non-resiliently directly coupleable to the shaft in a temporary predetermined loaded condition.

4 Claims, 5 Drawing Sheets

ISOLATOR DECOUPLER

FIELD OF THE INVENTION

The invention relates to an isolator decoupler, and more particularly, to an isolator decoupler wherein a torsion spring engaged between the pulley and the one-way clutch to resiliently couple the pulley to the shaft, and the pulley non-resiliently directly coupleable to the shaft in a temporary predetermined loaded condition.

BACKGROUND OF THE INVENTION

Serpentine accessory drive systems are routinely used in automotive vehicles to drive engine accessories. A typical serpentine drive system includes a driving pulley on the crankshaft of an internal combustion engine of the vehicle, a series of driven pulleys for the accessories and a multi-ribbed belt trained about the driving and driven pulleys. An advantage of the serpentine drive is that, by providing an automatic belt tensioner on the belt, the accessories can be fixedly mounted.

The driving pulley establishes a highly dynamic loading on the belt. This high dynamic loading is due to the variable torque output characteristics of internal combustion engines. Under this circumstance, the tensioner cannot accommodate all of the variable torque characteristics and belt load changes caused by the variable torque. The result can be noise and decreased belt life due to instantaneous belt slippage.

Representative of the art is U.S. Pat. No. 6,083,130 (2000) which discloses a serpentine belt drive system for an automotive vehicle comprising a drive assembly including an internal combustion engine having an output shaft with a driving pulley thereon rotatable about a driving pulley axis. A sequence of driven assemblies each has a driven pulley rotatable about an axis parallel with the driving pulley axis and a serpentine belt mounted in cooperating relation with the driving pulley and with the driven pulleys in a sequence which corresponds with the sequence of the driven assemblies when related to the direction of movement of the belt to cause said driven pulleys to rotate in response to the rotation of the driving pulley. The sequence of driven assemblies includes an alternator assembly including an alternator shaft mounted for rotation about a shaft axis. A hub structure is fixedly carried by the alternator shaft for rotation therewith about the shaft axis. A spring and one-way clutch mechanism couples the alternator pulley with the hub structure. The spring and one-way clutch mechanism comprises a resilient spring member separately formed from and connected in series with a one-way clutch member. The resilient spring member is constructed and arranged to transmit the driven rotational movements of the alternator pulley by the serpentine belt to the hub structure such that the alternator shaft is rotated in the same direction as the alternator pulley while being capable of instantaneous relative resilient movements in opposite directions with respect to the alternator pulley during the driven rotational movement thereof. The one-way clutch member is constructed and arranged to allow the hub structure and hence the alternator shaft to rotate at a speed in excess of the rotational speed of the alternator pulley when the speed of the engine output shaft is decelerated to an extent sufficient to establish the torque between the alternator pulley and the hub structure at a predetermined negative level.

What is needed is an isolator decoupler comprising a torsion spring engaged between the pulley and the one-way clutch to resiliently couple the pulley to the shaft, and the pulley non-resiliently directly coupleable to the shaft in a temporary predetermined loaded condition. The present invention meets this need.

SUMMARY OF THE INVENTION

The primary aspect of the invention is to provide an isolator decoupler comprising a torsion spring engaged between the pulley and the one-way clutch to resiliently couple the pulley to the shaft, and the pulley non-resiliently directly coupleable to the shaft in a temporary predetermined loaded condition.

Other aspects of the invention will be pointed out or made obvious by the following description of the invention and the accompanying drawings.

The invention comprises an isolator decoupler comprising a pulley, a shaft, a bushing slidingly engaged with the pulley and slidingly engaged with the shaft, the pulley journalled to the shaft by a bearing, a one-way clutch fixed to the shaft and engaged with the bushing whereby the bushing rotates in unison with the one-way clutch, a torsion spring engaged between the pulley and the one-way clutch to resiliently couple the pulley to the shaft, and the pulley non-resiliently directly coupleable to the shaft in a temporary predetermined loaded condition.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
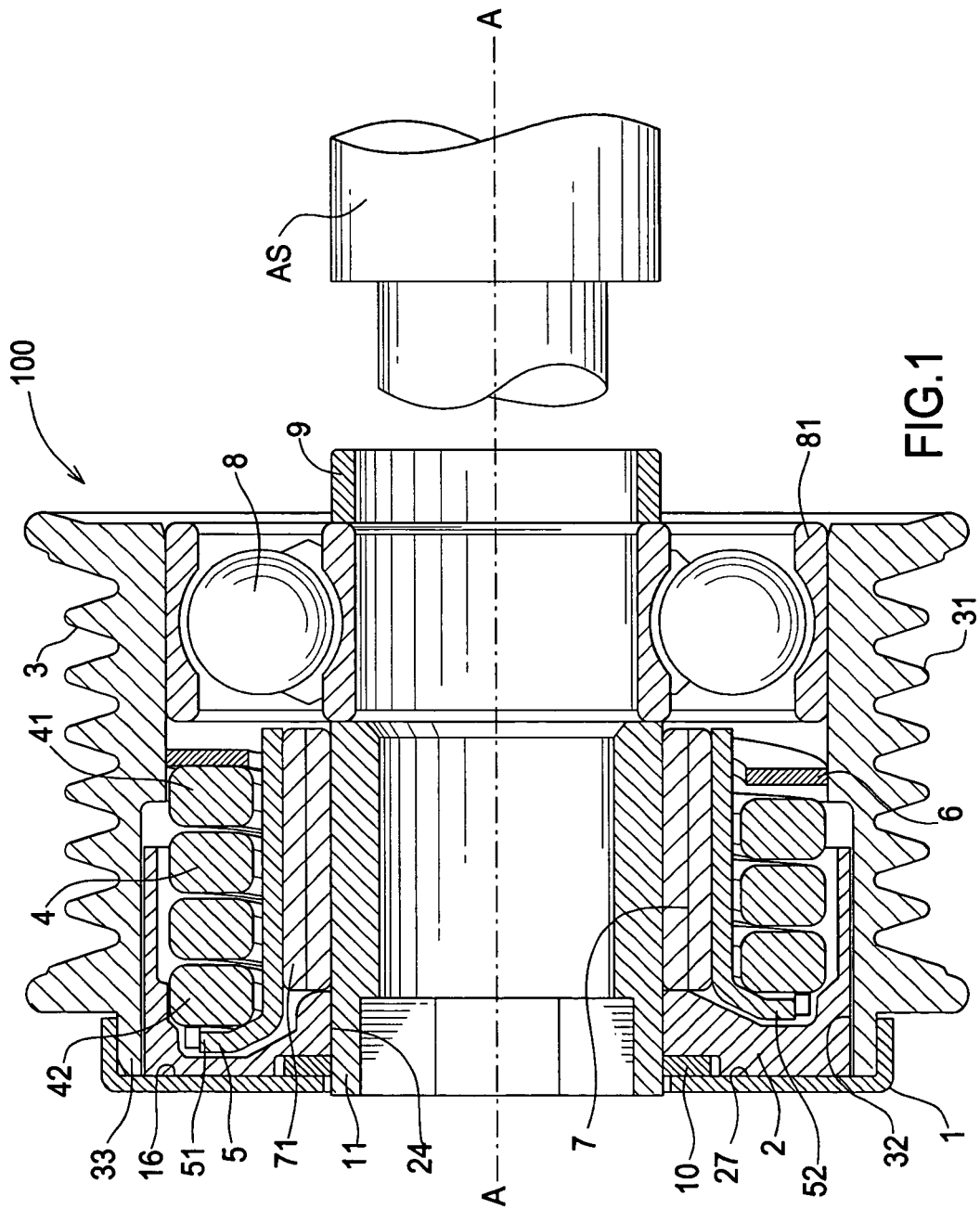
FIG. 1 is a cross sectional view of the isolator decoupler.

FIG. 1 is a cross sectional view of the isolator decoupler. Isolator decoupler 100 comprises a pulley 3 having a multi-ribbed surface 31. Pulley 3 is rotationally mounted to the outer race 81 of a ball bearing 8. Bearing 8 may also comprise a sleeve, bushing, needle or other suitable form of bearing.

A spring retainer 6 is press fit into the pulley 3. An end 41 of torsion spring 4 engages spring retainer 6. The other end 42 of torsion spring 4 engages plastic bushing 2. Bushing 2 is disposed between pulley 3 and shaft 11.

One-way clutch 7 is a roller type clutch having a cage and an inner and outer race. The inner diameter of the one-way clutch is formed by the shaft 11. A clutch carrier 5 is press fit onto the one-way clutch outer race 71.

Clutch carrier 5 comprises two tabs 51 that extend radially from the carrier in a direction normal to an axis of rotation A-A. Each tab 51 cooperatively engages a recess 22 in bushing 2, whereby torque is transmitted. Engaging tabs 51 into recesses 22 in this manner causes rotational movement of bushing 2 to be controlled by one-way clutch 7, hence bushing 2 rotates in unison with clutch carrier 5 and one-way clutch 7.

Bushing 2 is axially locked on the shaft 11 between cover 1 and spring 42. Spring 42 presses clutch carrier 5, and thereby tabs 51 into bushing 2. The other end of spring 42 is engaged with spring retainer 6. The isolator decoupler is covered by an outer end cover 1 to prevent debris from entering the device. An axial position of the pulley on an alternator shaft (AS) can be adjusted by a spacer 9. Bushing 2 may comprise any low friction plastic material known in the art.

Torque is transmitted from a belt (not shown) to pulley 3. From pulley 3 torque is transmitted to spring retainer 6, then to torsion spring 4, then to bushing 2 and then to one-way clutch carrier 5 then to one-way clutch 7, then to the shaft 11 and in the end to an accessory shaft, such as an alternator shaft AS.

In operation torque is resiliently transmitted by spring 4 being torsionally loaded in the unwinding direction. During torque reversals due to inertia of the driven accessory the driven shaft 11 will tend to overrun pulley 3. Before there is significant overrun, torsion spring 4 will unload to its neutral (not loaded) position. Once spring 4 is unloaded, the accessory shaft which is connected to shaft 11 is disconnected from the clutch carrier 5 by one-way clutch 7.

Torsion spring 4 can not be loaded in the opposite (winding) direction from the load direction because each end 41, 42 of spring 4 would disengage from its respective engagement with portion 26 and portion 64.

Torsion spring 4 is slightly preloaded or compressed between spring retainer 6 and bushing 2 to generate a predetermined amount of damping to limit relative motion between device components.

One-way clutch 7 is a roller type one-way clutch which does not have bearing support between inner and outer races. Absence of bearing support between inner and outer races makes design smaller, cheaper, and lighter. For example, one-way clutch 7 is available from SBF or NTN Corporation located at 1-3-17, Kyomachibori, Nishi-ku, Osaka-shi, Osaka 550-0003 Japan, using HF or HFL style clutches. In the instant embodiment the manufacturer is Suzhou Bearing Factory (SBF) and the part number is HF2016.

Further bushing 2 has inner 24 and outer 21 bearing friction surfaces. Outer bearing surface 21 slidingly engages surface 32 of pulley 3. Surface 21 functions during isolating mode, that is, when torsion spring 4 is loaded pulley 3 with spring retainer 6, and thereby pulley 3, is allowed to move relative to bushing 2.

Cover surface 16 frictionally engages bushing surface 27. The frictional engagement between surface 16 and surface 27 provides a predetermined amount of damping so that during a torque reversal spring 4 remains seated between portion 64 and portion 26. This in turn prevents noise that might otherwise be caused by relative movement of the spring in the device between bushing 2 and spring retainer 6.

During over running mode (torque reversal) inner bearing surface 24 of bushing 2 has a sliding engagement with shaft 11 so that shaft 11 can "overrun" bushing 2 and thereby pulley 3. In this manner shaft 11 and bushing 2 have relative rotational motion. Separating friction surfaces in this manner reduces frictional load, wear, and heat build up in the isolator decoupler.

The device further comprises stops which limit spring unwinding during loaded operation to prevent overload of the spring. The stops are located between clutch carrier 5 and spring retainer 6, namely, spring retainer tabs 61 cooperatively engage tab portions 52 in an overload condition. Under normal loading and normal operational torque conditions each tab 61 is not in contact with a tab 52. However, during excessive loading spring 4 unwinds and each tab 61 engages a tab 52, thereby directly and non-resiliently coupling pulley 3 to shaft 11, in effect bypassing spring 4 and one-way clutch 7. For example, such overload conditions may be present during engine acceleration conditions.

Spring 4 is also preloaded by a small angle to prevent spring 4 from leaving its seat 25 on bushing 2 and from spring retainer 6. The preload angle is approximately 5 degrees which equates to a torque of approximately 1 to 2 N-m. In this "no-load" condition tab 61 bears against a tab 52, see FIG. 5, hence causing the preload.

Figure 2:
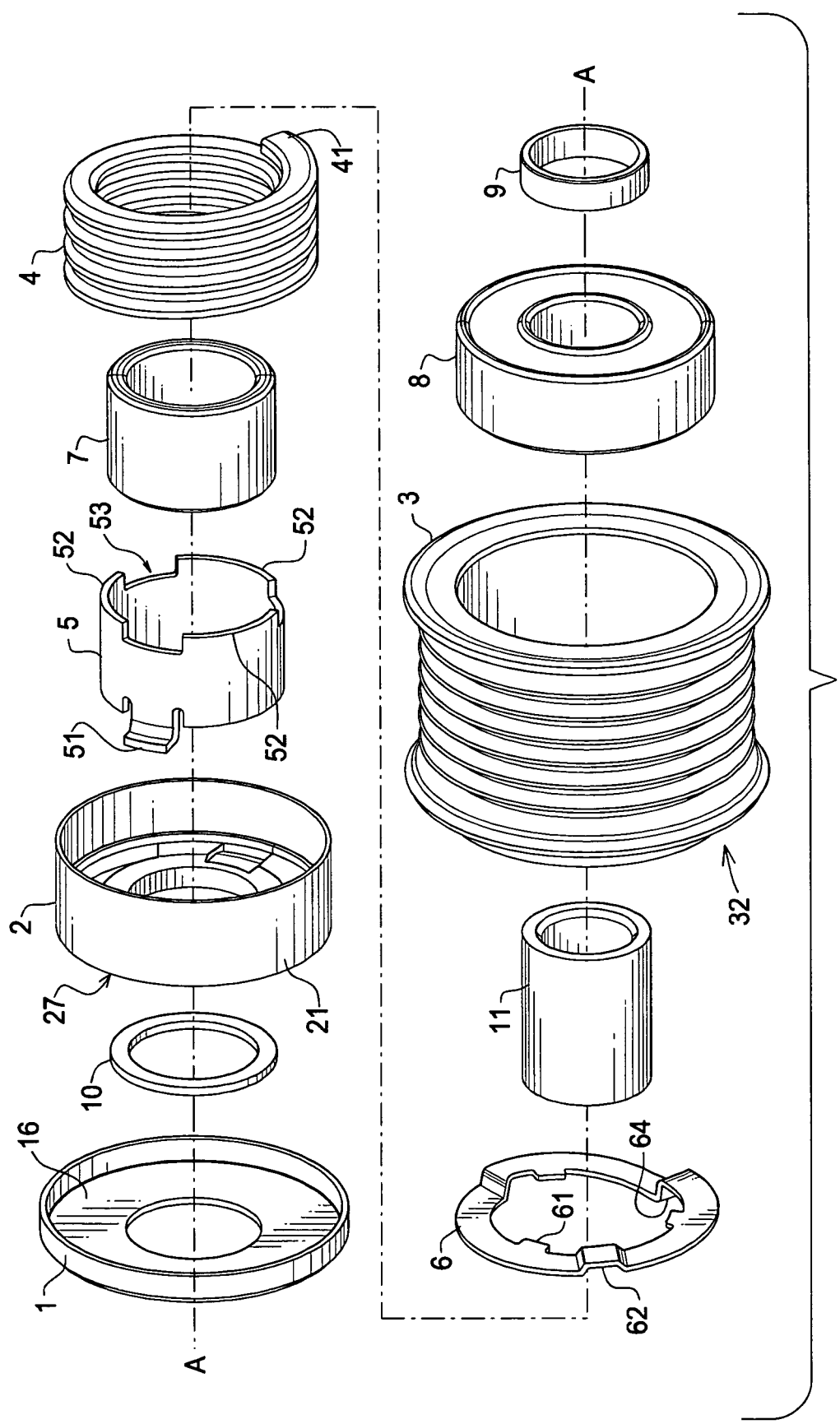
FIG. 2 is an exploded view of the isolator decoupler.

FIG. 2 is an exploded view of the isolator decoupler. Outer surface 21 slidingly engages an inner surface 32 of pulley 3. End 41 butts against end portion 64.

Snap ring 10 retains bushing 2 on shaft 11. Cover 1 is press fit over an edge 33 of pulley 3.

Figure 3:
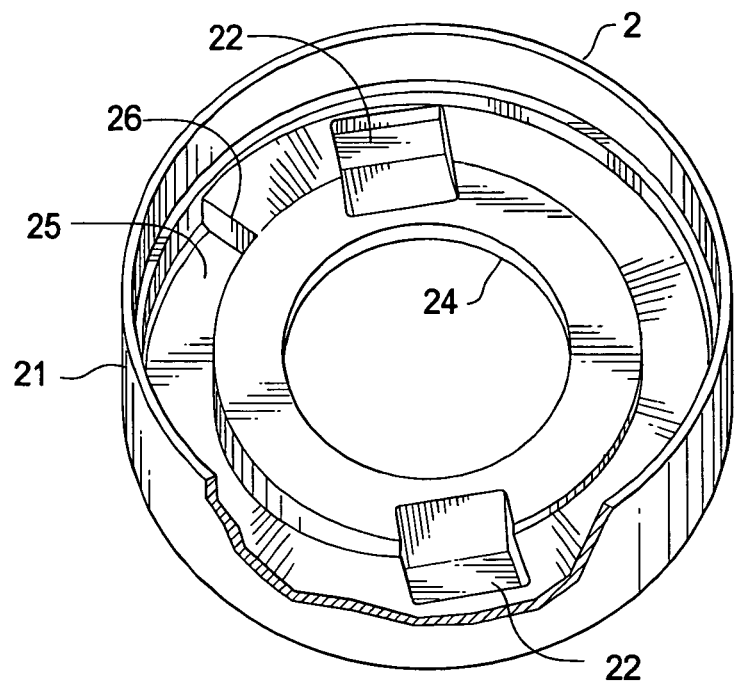
FIG. 3 is a perspective view of the bushing.

FIG. 3 is a perspective view of the bushing. Inner surface 24 slidingly engages an outer surface of shaft 11. Each recess 22 receives a tab 64. A volute of spring 4 bears upon surface 25. End 42 bears upon end portion 26.

Figure 4:
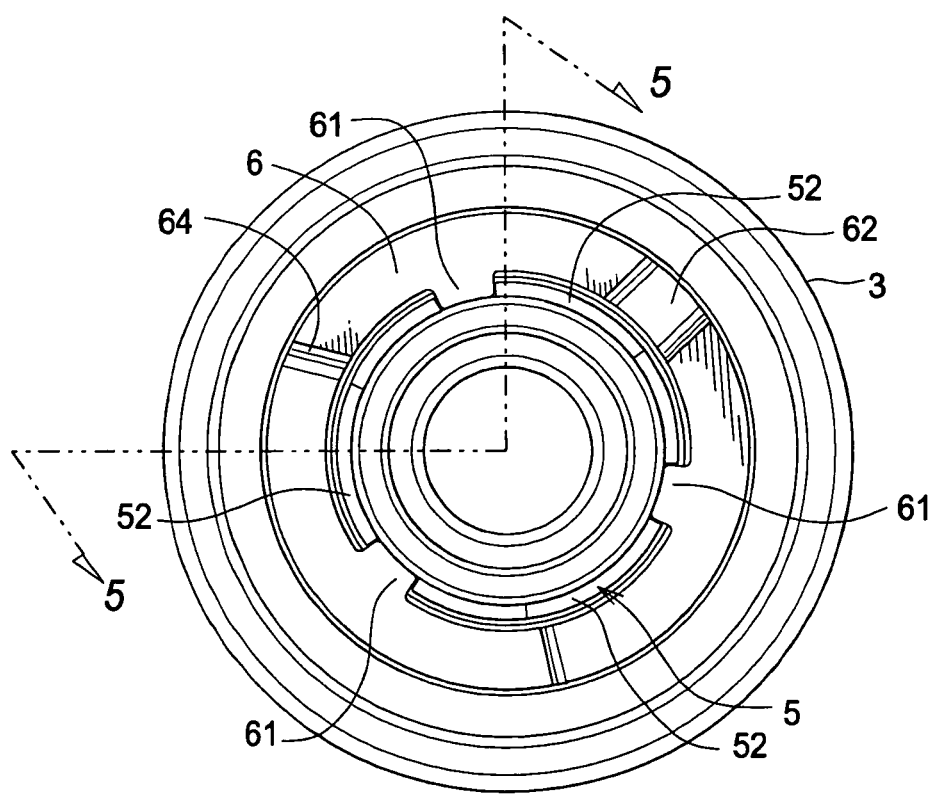
FIG. 4 is an end view of the isolator decoupler.

FIG. 4 is an end view of the isolator decoupler. Tabs 61 in spring retainer 6 engage cooperating receiving portions, or gaps, 53 in clutch carrier 5. Spring retainer 6 is rotationally moveable with respect to clutch carrier 5 to accommodate normal load fluctuations as well as torque reversals.

Figure 5:
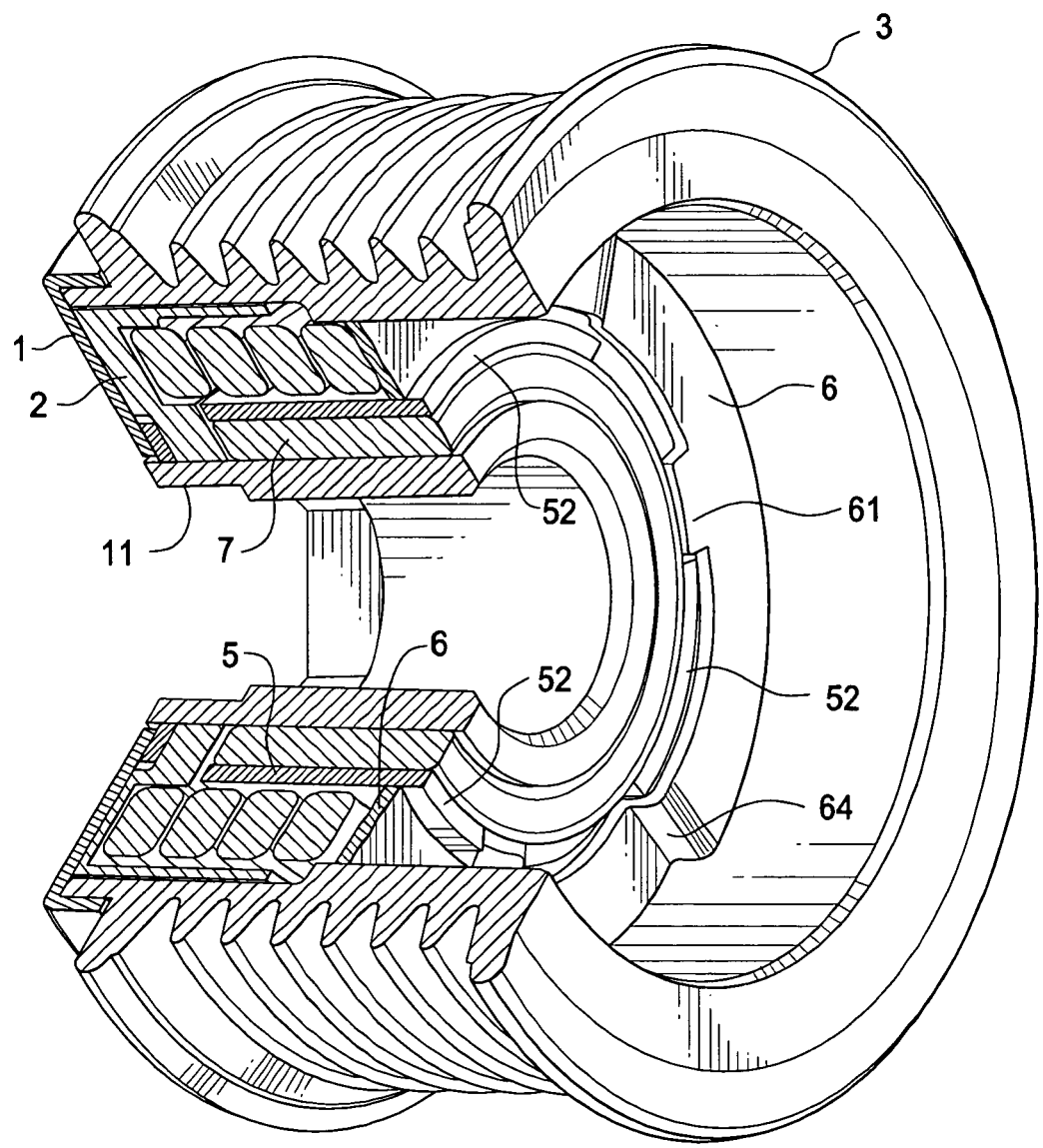
FIG. 5 is a perspective view of FIG. 4.

FIG. 5 is a perspective view of FIG. 4. Tab 61 is shown bearing upon tab 52 in the no-load condition due to the slight spring preload. As the isolator is loaded and spring 4 is unwound, tab 61 will move away from tab 52 which it engages in the no-load condition. In the event of an overload condition each tab 61, by relative rotation of spring retainer 6 with respect to clutch carrier 5, will come into contact with the next successive tab 52. Each tab 61 moves within gap 53 between tabs 52. Namely, the first tab 61 and second tab 52 are cooperatively engagable whereby a rotational range of movement of the spring retaining member 6 with respect to the one-way clutch carrier 5 is limited between a first no-load position and the second overloaded position wherein the pulley is capable of being temporarily directly coupled with the shaft in the maximum overloading condition by direct contact of tab 61 with tab 52.

Figure 6:
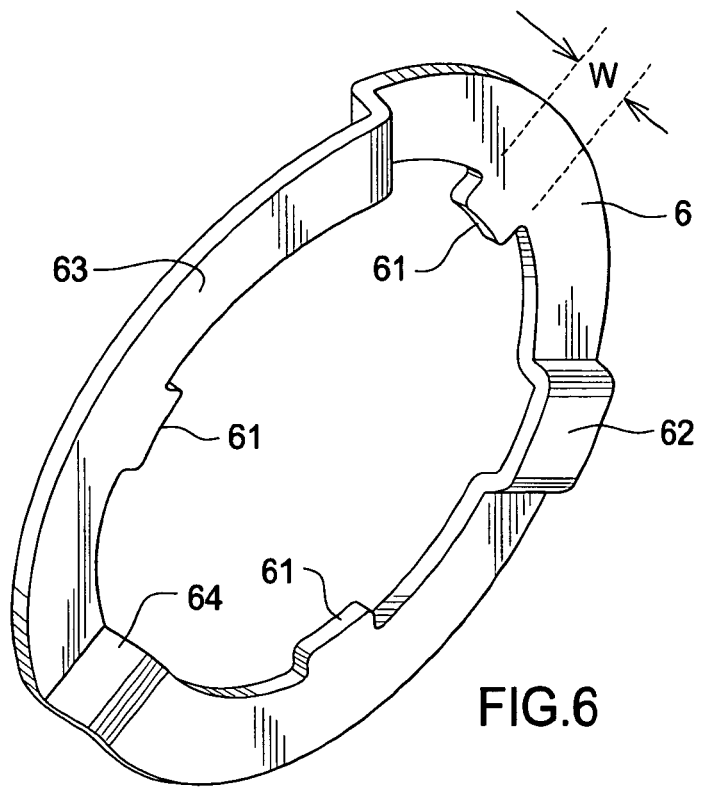
FIG. 6 is a perspective view of the spring retainer.

FIG. 6 is a perspective view of the spring retainer. The spring retainer comprises tabs 61 which extend radially inward. Member 62 comprises a projecting surface which supports a volute of the spring. Sloped portion 63 supports a volute of the spring 4. End 41 of spring 4 bears against end portion 64.

Figure 7:
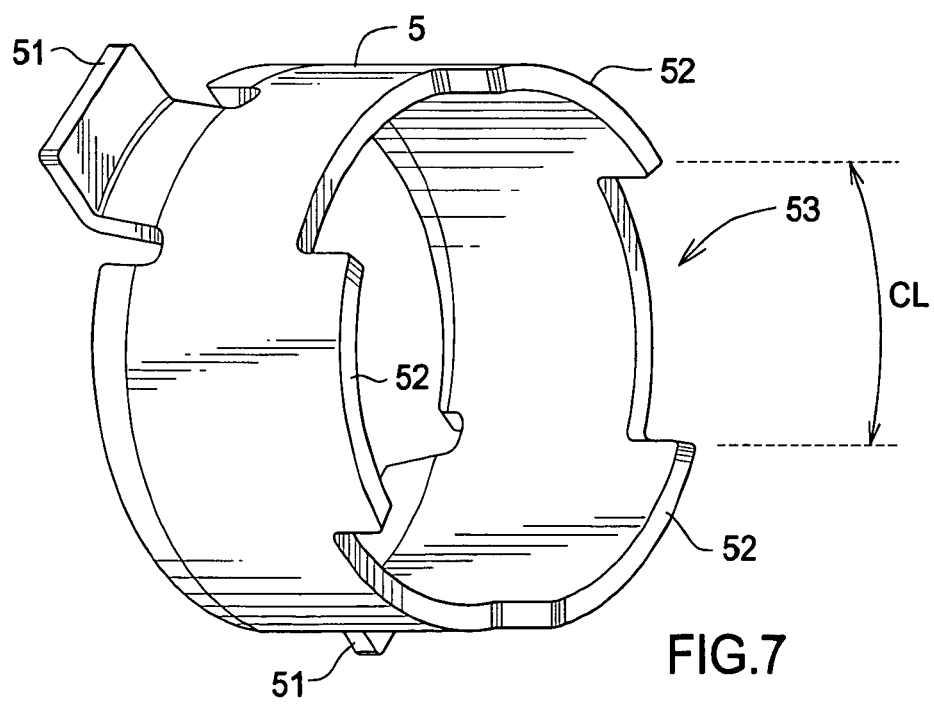
FIG. 7 is a perspective view of the clutch carrier.

FIG. 7 is a perspective view of the clutch carrier. Clutch carrier 5 is press fit upon an outer race of one-way clutch 7. Clutch carrier 5 comprises tab portions 52 which extend in an axial direction. Receiving portions 53 are disposed between and defined by tab portions 52. The circumferential length CL of each portion 53 is greater than the width W of each tab 61. This allows some relative rotational movement between spring retainer 6 and clutch carrier 5 during normal operation and torque reversals, that is, the first tab 52 and second tab 61 are cooperatively engaged whereby a rotational range of movement of the one-way clutch carrier 5 with respect to the spring retaining member 6 is limited. Further, this arrangement allows torsion spring 4 to be rotationally temporarily disengageable from the one-way clutch 7 between a first position and a second position as determined by engagement of tabs 53 and 61. During steady state, zero acceleration operation each tab 61 is substantially centrally located in each recess 53 between each tab 52.

Although a form of the invention has been described herein, it will be obvious to those skilled in the art that variations may be made in the construction and relation of parts without departing from the spirit and scope of the invention described herein.

We claim:

1. An isolator decoupler comprising:
   a pulley (3);
   a shaft (11);
   a bushing (2) slidingly engaged with the pulley and Slidingly engaged with the shaft;
   the pulley journalled to the shaft by a bearing (8);
   a one-way clutch (7) fixed to the shaft and engaged with the bushing whereby the bushing rotates in unison with the one-way clutch;
   a torsion spring (4) engaged between the pulley and the one-way clutch to resiliently couple the pulley to the shaft; and
   the pulley non-resiliently directly coupleable to the shaft in a temporary predetermined loaded condition.

2. The isolator decoupler as in claim 1, wherein the torsion spring is torsionally loaded in an unwinding direction.

3. The isolator decoupler as in claim 1 further comprising:
   a one-way clutch carrier engaged operationally between the bushing and the one-way clutch, the one-way clutch carrier having a first tab;
   a spring retaining member connect to the pulley and engaging the torsion spring, the spring retaining member having a second tab;
   the first tab and second tab cooperatively engagable whereby a rotational range of movement of the spring retaining member with respect to the one-way clutch carrier is limited between the first position and the second position wherein the pulley is capable of being temporarily directly coupled with the shaft in a maximum loading condition.

4. The isolator decoupler as in claim 1, wherein the temporary predetermined condition is a spring overload condition.

* * * * *

SEQUENCE LISTING

<160> NUMBER OF SEQ ID NOS: 7

<210> SEQ ID NO 1
<211> LENGTH: 1042
<212> TYPE: DNA
<213> ORGANISM: Homo sapiens
<220> FEATURE:
<221> NAME/KEY: Unsure
<222> LOCATION: 447
<223> OTHER INFORMATION: Unknown base

<400> SEQUENCE: 1

| | | |
|---|---|---|
| tttcctcact gactataaaa gaatagagaa ggaagggctt cagtgaccgg | 50 |
| ctgcctggct gacttacagc agtcagactc tgacaggatc atggctatga | 100 |
| tggaggtcca gggggaccc agcctgggac agacctgcgt gctgatcgtg | 150 |
| atcttcacag tgctcctgca gtctctctgt gtggctgtaa cttacgtgta | 200 |
| ctttaccaac gagctgaagc agatgcagga caagtactcc aaaagtggca | 250 |
| ttgcttgttt cttaaaagaa gatgacagtt attgggaccc caatgacgaa | 300 |
| gagagtatga acagcccctg ctggcaagtc aagtggcaac tccgtcagct | 350 |
| cgttagaaag atgattttga gaacctctga ggaaaccatt tctacagttc | 400 |
| aagaaaagca acaaaatatt tctcccctag tgagagaaag aggtccncag | 450 |
| agagtagcag ctcacataac tgggaccaga ggaagaagca acacattgtc | 500 |
| ttctccaaac tccaagaatg aaaaggctct gggccgcaaa ataaactcct | 550 |
| gggaatcatc aaggagtggg cattcattcc tgagcaactt gcacttgagg | 600 |
| aatggtgaac tggtcatcca tgaaaaaggg ttttactaca tctattccca | 650 |
| aacatacttt cgatttcagg aggaaataaa agaaaacaca agaacgaca | 700 |
| aacaaatggt ccaatatatt tacaaataca caagttatcc tgaccctata | 750 |
| ttgttgatga aaagtgctag aaatagttgt tggtctaaag atgcagaata | 800 |
| tggactctat tccatctatc aagggggaat atttgagctt aaggaaaatg | 850 |
| acagaatttt tgtttctgta acaaatgagc acttgataga catggaccat | 900 |
| gaagccagtt ttttcggggc cttttttagtt ggctaactga cctggaaaga | 950 |
| aaaagcaata acctcaaagt gactattcag ttttcaggat gatacactat | 1000 |
| gaagatgttt caaaaaatct gaccaaaaca aacaaacaga aa | 1042 |

<210> SEQ ID NO 2
<211> LENGTH: 281
<212> TYPE: PRT
<213> ORGANISM: Homo sapiens

<400> SEQUENCE: 2

Met Ala Met Met Glu Val Gln Gly Gly Pro Ser Leu Gly Gln Thr
1               5                   10                  15

Cys Val Leu Ile Val Ile Phe Thr Val Leu Leu Gln Ser Leu Cys
                20                  25                  30

Val Ala Val Thr Tyr Val Tyr Phe Thr Asn Glu Leu Lys Gln Met
                35                  40                  45

Gln Asp Lys Tyr Ser Lys Ser Gly Ile Ala Cys Phe Leu Lys Glu
                50                  55                  60

Asp Asp Ser Tyr Trp Asp Pro Asn Asp Glu Glu Ser Met Asn Ser
                65                  70                  75

```
Pro Cys Trp Gln Val Lys Trp Gln Leu Arg Gln Leu Val Arg Lys
                80                  85                  90

Met Ile Leu Arg Thr Ser Glu Glu Thr Ile Ser Thr Val Gln Glu
            95                 100                 105

Lys Gln Gln Asn Ile Ser Pro Leu Val Arg Glu Arg Gly Pro Gln
        110                 115                 120

Arg Val Ala Ala His Ile Thr Gly Thr Arg Gly Arg Ser Asn Thr
    125                 130                 135

Leu Ser Ser Pro Asn Ser Lys Asn Glu Lys Ala Leu Gly Arg Lys
140                 145                 150

Ile Asn Ser Trp Glu Ser Ser Arg Ser Gly His Ser Phe Leu Ser
                155                 160                 165

Asn Leu His Leu Arg Asn Gly Glu Leu Val Ile His Gly Lys Gly
            170                 175                 180

Phe Tyr Tyr Ile Tyr Ser Gln Thr Tyr Phe Arg Phe Gln Glu Glu
        185                 190                 195

Ile Lys Glu Asn Thr Lys Asn Asp Lys Gln Met Val Gln Tyr Ile
    200                 205                 210

Tyr Lys Tyr Thr Ser Tyr Pro Asp Pro Ile Leu Leu Met Lys Ser
215                 220                 225

Ala Arg Asn Ser Cys Trp Ser Lys Asp Ala Glu Tyr Gly Leu Tyr
                230                 235                 240

Ser Ile Tyr Gln Gly Gly Ile Phe Glu Leu Lys Glu Asn Asp Arg
            245                 250                 255

Ile Phe Val Ser Val Thr Asn Glu His Leu Ile Asp Met Asp His
        260                 265                 270

Glu Ala Ser Phe Phe Gly Ala Phe Leu Val Gly
    275                 280

<210> SEQ ID NO 3
<211> LENGTH: 87
<212> TYPE: DNA
<213> ORGANISM: Artificial sequence
<220> FEATURE:
<223> OTHER INFORMATION: Sequence is synthesized
<220> FEATURE:
<221> NAME/KEY: unsure
<222> LOCATION: 25-26, 28-29, 31-32, 34-35, 37-38, 40-41, 43-44, 46-47,
      49-50, 52-53, 55-56, 58-59, 61-62, 64-65, 67-68, 70-71, 73-74
<223> OTHER INFORMATION: unknown base

<400> SEQUENCE: 3
gccgtctata cttgtggtgc tggtnnsnns nnsnnsnnsn nsnnsnnsnn         50
snnsnnsnns nnsnnsnnsn nsnnstgggg tcagggt                      87

<210> SEQ ID NO 4
<211> LENGTH: 17
<212> TYPE: PRT
<213> ORGANISM: Artificial sequence
<220> FEATURE:
<223> OTHER INFORMATION: Sequence is synthesized

<400> SEQUENCE: 4

Arg Ile Gly Arg Ser Val Phe Asn Leu Arg Glu Ser Trp Val
1               5                  10                  15

Thr Trp

<210> SEQ ID NO 5
<211> LENGTH: 417
```

```
<212> TYPE: DNA
<213> ORGANISM: Artificial sequence
<220> FEATURE:
<223> OTHER INFORMATION: Sequence is synthesized

<400> SEQUENCE: 5
gatgttcagt tgcaggaatc aggcggtggc ttggtacagg ccggaggttc      50
gttgcgtttg tcctgtgctg cctcgggtgc tactggttct acttatgata     100
tgggctggtt tcgtcaggct ccgggtaaag aacgtgaatc ggttgccgcc     150
attaactggg ggtcggctgg gacttactat gcttcgtccg tccgtggtcg     200
ttttactatt tcacgtgata atgccaaaaa aactgtctat ttgcagatga     250
attcattgaa accagaagat actgccgtct atacttgtgg tgctggtagg     300
atcggccggt cggtcttcaa cttgaggagg gagagctggg tcacgtggtg     350
gggtcagggt acccaggtca ctgtctcctc tgccggtggt atggattata     400
aagatgatga tgataaa                                         417

<210> SEQ ID NO 6
<211> LENGTH: 38
<212> TYPE: DNA
<213> ORGANISM: Artificial sequence
<220> FEATURE:
<223> OTHER INFORMATION: Sequence is synthesized

<400> SEQUENCE: 6
gcttgctaca tatggtgaga gaaagaggtc ctcagaga                   38

<210> SEQ ID NO 7
<211> LENGTH: 50
<212> TYPE: DNA
<213> ORGANISM: Artificial sequence
<220> FEATURE:
<223> OTHER INFORMATION: Sequence is synthesized

<400> SEQUENCE: 7
cttgaatagg atccctatta gccaactaaa aaggccccaa aaaaactggc       50
```